United States Patent
Stautner

(10) Patent No.: US 11,205,945 B2
(45) Date of Patent: Dec. 21, 2021

(54) PARTIAL CRYOGENIC SHIELDING ASSEMBLY IN A SUPERCONDUCTING GENERATOR AND METHODS OF ASSEMBLING THE SAME

(71) Applicant: General Electric Company, Schenectady, NY (US)

(72) Inventor: Ernst Wolfgang Stautner, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/059,555

(22) PCT Filed: Jun. 1, 2018

(86) PCT No.: PCT/US2018/035558
§ 371 (c)(1),
(2) Date: Nov. 30, 2020

(87) PCT Pub. No.: WO2019/231461
PCT Pub. Date: Dec. 5, 2019

(65) Prior Publication Data
US 2021/0211036 A1    Jul. 8, 2021

(51) Int. Cl.
*F03D 9/25* (2016.01)
*F03D 80/80* (2016.01)
(Continued)

(52) U.S. Cl.
CPC ............. *H02K 55/02* (2013.01); *F03D 9/25* (2016.05); *F03D 80/80* (2016.05); *H02K 7/1838* (2013.01)

(58) Field of Classification Search
CPC ........ H02K 55/02; H02K 7/1838; F03D 9/25; F03D 80/80
(Continued)

(56) References Cited

U.S. PATENT DOCUMENTS 3,521,091 A *  7/1970  Halas ................... H02K 55/02
                                                   310/10
4,156,580 A *  5/1979  Pohl ......................... F03D 3/02
                                                   415/4.2
(Continued)

OTHER PUBLICATIONS

Parma, V., Cryostat Design, Jan. 2015, pp. 353-399.
PCT Search Report and Written Opinion, dated Feb. 27, 2019.

*Primary Examiner* — Charles Reid, Jr.
(74) *Attorney, Agent, or Firm* — Dority & Manning, P.A.

(57) ABSTRACT

An annular field of a superconducting generator includes a partial cryogenic shielding assembly and a superconducting field winding surrounded by a thermal shield. The thermal shield is surrounded by a housing defining an insulating vacuum enclosure. The annular field includes a torque tube assembly disposed within the housing and coupling the thermal shield to the housing. A blanket of multi-layer thermal insulation is disposed within the vacuum enclosure, extending generally between the housing and the thermal shield. The annular field further includes a partial cryogenic shielding assembly including a floating shield disposed within the vacuum enclosure, between the housing and the thermal shield. The floating shield extends only a portion of an overall length of the housing. The floating shield includes an insulative stack of multi-layer thermal insulation. A superconducting generator and a wind turbine utilizing the superconducting generator with improved partial shielding are disclosed.

20 Claims, 6 Drawing Sheets

(51) Int. Cl.
*H02K 7/18* (2006.01)
*H02K 55/02* (2006.01)

(58) Field of Classification Search
USPC .................................................. 290/44, 55
See application file for complete search history.

(56) References Cited

U.S. PATENT DOCUMENTS

| | | |
|---|---|---|
| 5,651,256 A | 7/1997 | Herd et al. |
| 5,774,032 A * | 6/1998 | Herd ..................... H01F 6/06 335/216 |
| 2008/0197633 A1 | 8/2008 | Trifon et al. |
| 2012/0049531 A1 | 3/2012 | Bray |
| 2014/0100113 A1* | 4/2014 | Stautner .................. H01F 6/04 505/163 |
| 2014/0100114 A1 | 4/2014 | Stautner et al. |
| 2014/0374136 A1* | 12/2014 | Graff ..................... H01L 39/00 174/125.1 |

\* cited by examiner

PARTIAL CRYOGENIC SHIELDING ASSEMBLY IN A SUPERCONDUCTING GENERATOR AND METHODS OF ASSEMBLING THE SAME

BACKGROUND

Embodiments of the present disclosure generally relate to a wind turbine including a superconducting generator and more particularly, to methods and systems for cryocooling of the superconducting generator.

Superconducting magnets are used in various apparatus such as, but not limited to, superconducting rotors for electric generators and motors, magnetic resonance imaging (MRI) systems for medical diagnosis, magnetic levitation devices for train transportation, nuclear fusion and large fault current limiting devices.

Conventional superconducting magnets include at least one superconducting coil that typically has to be thermally isolated from the environment and has to be kept at a required low temperature by a cryogenic coolant. Effective thermal isolation can be achieved for the cryogenically cooled parts by separating the cooled parts from warmer components of the electrical machine. Typically, these cryogenically cooled parts are surrounded by a 3-20 mm thick rigid thermal shield surrounded by a sturdy vacuum enclosure. The rigid thermal shield, which usually is made of aluminum or copper, reduces heat transfer from the surrounding warm environment, and more particularly the vacuum vessel (300 to 350 Kelvin), to help maintain a low cryogenic temperature in the superconducting coil and requires a sturdy support so as to keep the thermal shield spaced-apart from the super-conducting coil and the vacuum enclosure to reduce heat transfer.

Some superconducting magnets are conductively cooled by a cryocooler (such as that of a conventional Gifford-McMahon cryocooler) whose housing is hermetically connected to the vacuum enclosure, whose first stage extends from the housing into the vacuum enclosure to be in thermal contact with the thermal shield, and whose second stage extends from the first stage to be in thermal contact with the superconducting coil.

Other superconducting magnets are cooled by a liquid cryogen (such as liquid helium) in which is placed the superconducting coil assembly, so-called "bath cooling". This type of cryogenic vessel used to maintain low cryogenic temperatures of samples or devices mounted within is often referred to as a cryostat. A thermal shield surrounds the dewar, and a vacuum enclosure surrounds the thermal shield. To reduce liquid helium boil-off, it is known to add a cryocooler coldhead whose housing is hermetically connected to the vacuum enclosure, whose first stage is in thermal contact with the outer thermal shield, and whose second stage is in thermal contact with the inner thermal shield. It is noted that the outer thermal shield is cooled by the first stage of the cryocooler coldhead to reduce heat transfer across the thermal shield, as is well within the understanding of the artisan. Typical cryostats have a 300 to 350 K outer vacuum shell temperature due to the armature heating of the vacuum vessel. This heating of the vacuum vessel results in higher thermal radiation onto the thermal shield. It is known to use a blanket of multi-layer insulation, such as crinkled or uncrinkled layers of gold or aluminized polyester film or plastic sheets, such as Mylar®, on or/and between the thermal shield and the vacuum enclosure to further reduce heat transfer by thermal radiation from the wall of the vacuum vessel.

In a superconducting generator, the torque tube and thermal radiation are the two main heat loads. By further reducing the thermal radiation heat load, the number of cryocoolers required for shield cooling may be reduced. Thus, an improved thermal shielding for further reducing the thermal radiation heat load in the cryostat of a superconducting generator is desired. The improved thermal shielding provides for a reduction in the levelized cost of electricity (LCOE).

BRIEF DESCRIPTION

Various embodiments of the disclosure provide a stationary field including partial cryogenic thermal shielding for use in a super-conducting generator of a wind turbine. In accordance with an exemplary embodiment, disclosed is a stationary field. The stationary field includes a housing, at least one superconducting field winding, a thermal shield, a torque tube assembly, at least one flexible blanket of multi-layer thermal insulation and a partial cryogenic shielding assembly. The housing extends a first length and defines an insulating vacuum enclosure therein. The at least one superconducting field winding is disposed within the vacuum enclosure and spaced apart from the housing. The thermal shield is disposed within the vacuum enclosure and surrounding and spaced apart from the at least one superconducting field winding. The torque tube assembly is disposed within the housing and coupling the thermal shield to the housing. The at least one flexible blanket of multi-layer thermal insulation is disposed within the vacuum enclosure, generally surrounding the thermal shield, extending generally to the housing and generally to the thermal shield. The partial cryogenic shielding assembly is disposed within the vacuum enclosure. The partial cryogenic shielding assembly extends a second length, wherein the second length is less than the first length. The partial cryogenic shielding assembly is coupled to the housing and partially surrounding and generally spaced apart from the thermal shield.

In accordance with another exemplary embodiment, disclosed is a superconducting generator including partial cryogenic thermal shielding for use in a wind turbine. The superconducting generator includes an annular armature comprising a conductive armature winding and an annular field including a plurality of superconducting magnets disposed concentrically outside the annular armature and separated by an air gap. The annular field further comprising a housing, at least one superconducting field winding, a thermal shield and a partial cryogenic shielding assembly. The housing extends a first length and defines an insulating vacuum enclosure therein. The at least one superconducting field winding is disposed within the insulating vacuum enclosure and generally spaced apart from the housing. The thermal shield is disposed within the insulating vacuum enclosure and generally surrounding and generally spaced apart from the field winding. The partial cryogenic shielding assembly is disposed within the vacuum enclosure. The partial cryogenic shielding assembly extends a second length, wherein the second length is less than the first length. The partial cryogenic shielding assembly partially surrounds and is generally spaced apart from the thermal shield. The annular armature and the annular field is rotatable and the other of the annular armature and the annular field is stationary.

In accordance with yet another exemplary embodiment, disclosed is a wind turbine including a superconducting generator having partial cryogenic thermal shielding. The wind turbine includes a rotor comprising a plurality of blades, a shaft coupled to the rotor and a super-conducting generator coupled to the rotor via the shaft and configured to be operated via the rotor. The superconducting generator comprises an annular rotating armature and an annular stationary field disposed concentric to the annular rotating armature. The annular stationary field comprises a housing, a superconducting field winding, a thermal shield, a torque tube assembly, a flexible blanket of multi-layer thermal insulation and a partial cryogenic shielding assembly. The housing extends a first length and defines a vacuum enclosure therein. The superconducting field winding is disposed within the vacuum enclosure and is generally spaced apart from the housing. The thermal shield is disposed within the vacuum enclosure and is generally surrounding and generally spaced apart from the stationary field winding. The torque tube assembly is disposed within the housing and coupling the thermal shield to the housing. The flexible blanket of multi-layer thermal insulation is disposed within the vacuum enclosure, generally surrounding the thermal shield, extending generally to the housing and generally to the thermal shield. The floating shield is disposed within the vacuum enclosure. The partial cryogenic shielding assembly extends a second length, wherein the second length is less than the first length. The partial cryogenic shielding assembly is coupled to the housing and partially surrounding and generally spaced apart from the thermal shield.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
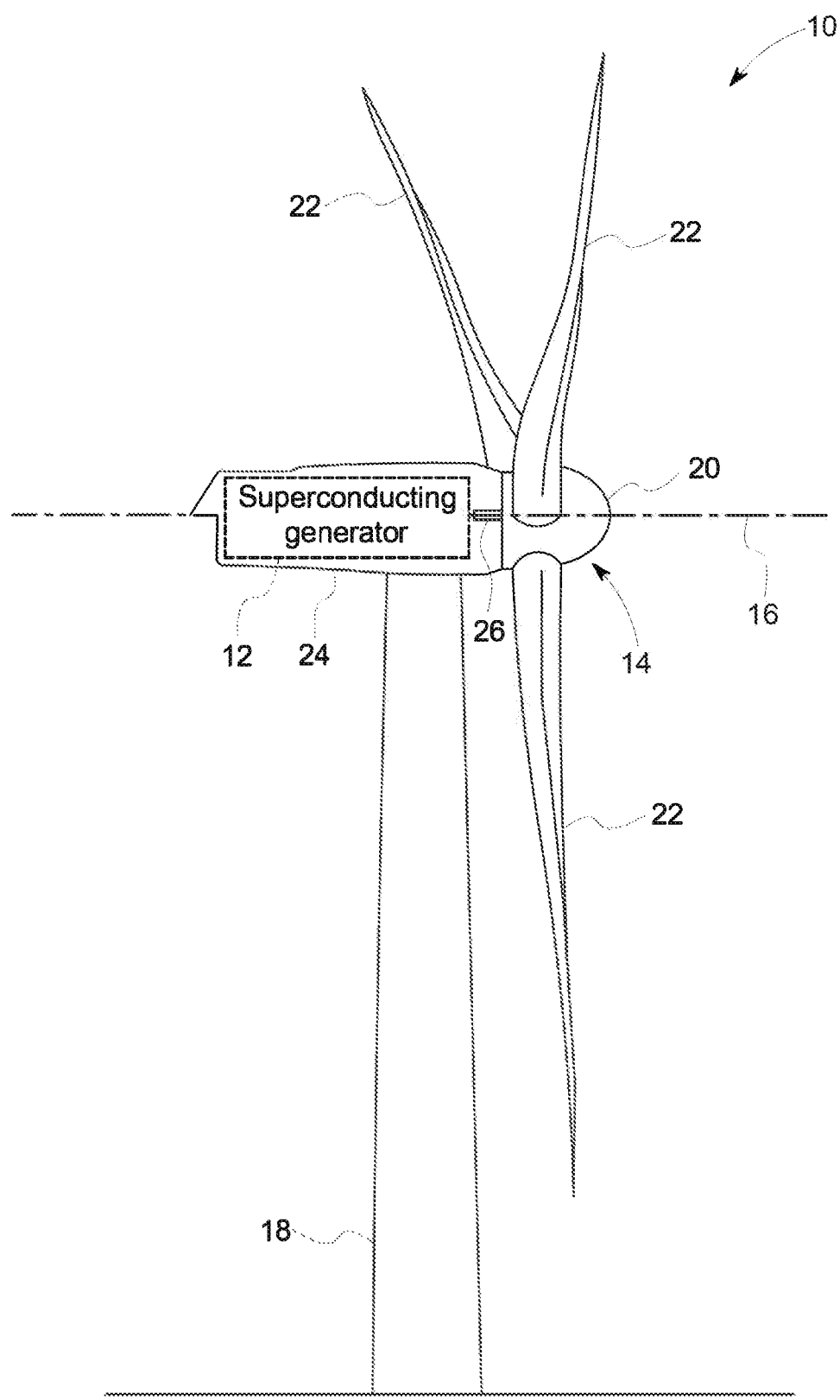
FIG. 1 is a schematic diagram of an example wind turbine, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In an effort to provide a concise description of these embodiments, all features of an actual implementation may not be described in the disclosure. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of a wind turbine are presented. The wind turbine includes a rotor having a plurality of blades. The wind turbine further includes a shaft coupled to the rotor and a superconducting generator coupled to the rotor via the shaft and configured to be operated via the rotor. The superconducting generator includes an armature configured to be rotated via the shaft. The superconducting generator further includes a stationary field disposed concentrically outside the armature. The stationary field includes a housing, defining an insulating vacuum enclosure and a superconducting field winding disposed inside the housing.

Referring now to FIG. 1, a schematic diagram of an example wind turbine 10 is presented, in accordance with one embodiment of the present disclosure. The wind turbine 10 may be configured to generate electrical power using wind energy. The wind turbine 10 described and illustrated in the embodiment of FIG. 1 includes a horizontal-axis configuration. However, in some embodiments, the wind turbine 10 or superconducting generator architecture may include, in addition or alternative to the horizontal-axis configuration, a vertical-axis configuration (not shown). The wind turbine 10 may be coupled to, such as, but not limited to, a power grid, for supplying electrical power generated to the grid.

The wind turbine 10 may include a body 12, sometimes referred to as a "nacelle," and a rotor 14 coupled to the body 12. The rotor 14 is configured to rotate with respect to the body 12 about an axis of rotation 16. In the embodiment of FIG. 1, the nacelle 12 is shown as mounted on a tower 18. However, in some other embodiments, the wind turbine 10 may include a nacelle that may be disposed adjacent to the ground (on-shore) and/or a surface of water (off-shore).

The rotor 14 may include a hub 20 and a plurality of blades 22 (sometimes referred to as "airfoils") extending radially outwardly from the hub 20 for converting wind energy into rotational energy. Although the rotor 14 is described and illustrated herein having three blades 22, the rotor 14 may have any number of blades 22. The rotor 14 may have blades 22 of any shape, and may have blades 22 of any type and/or any configuration, whether such shape, type, and/or configuration is described and/or illustrated herein.

In some embodiments, the nacelle 12 may house, fully or partially, one or more of a superconducting generator 24 and a shaft 26. The superconducting generator 24 may be coupled to the rotor 14 via the shaft 26 and configured to be operated via the rotor 14. For example, rotations of the rotor 14 caused due to the wind energy in turn cause a rotary element (e.g., an armature) of the generator 24 to rotate via the shaft 26. In some embodiments, the shaft 26 may also include a gear box (not shown). In certain embodiments, use of the gear box may increase an operating speed of the super-conducting generator 24 and reduce the torque requirement for a given power level. The presence or absence of a gearbox is immaterial to the super-conducting generator embodiments disclosed herein.

The superconducting generator 24 is configured to generate electrical power based on the rotations of an armature (described presently) relative to the stationary field. In accordance with some embodiments described herein, the superconducting generator 24 may be configured to handle increased magnitudes of electrical current in comparison to traditional generators. The superconducting generator 24 may be implemented in the form of a synchronous generator.

Figure 2:
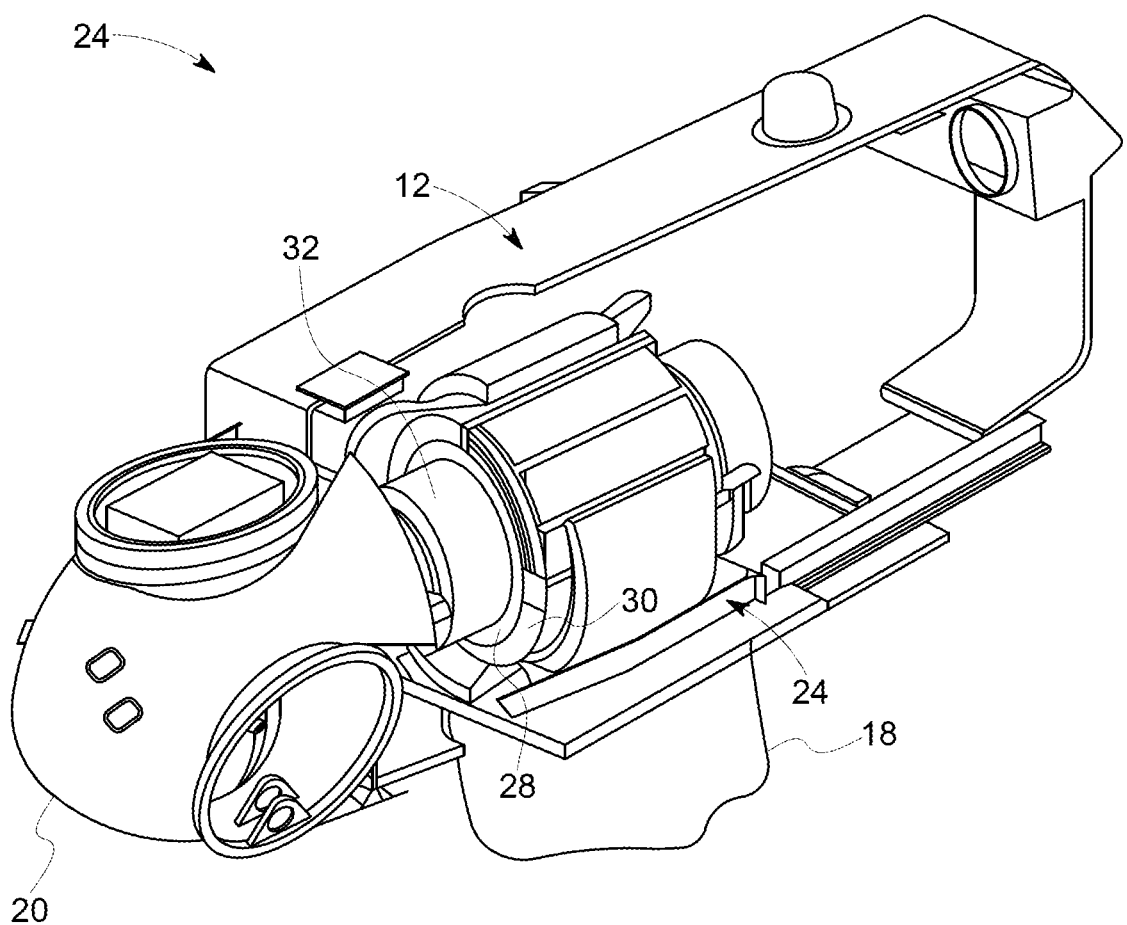
FIG. 2 is a cut-away view of a superconducting generator housed in a nacelle and coupled to a hub of the wind turbine shown in FIG. 1, in accordance with one or more embodiments shown or described herein.

FIG. 2 is a cut-away view of the nacelle 12 and hub 20 of FIG. 1 showing the superconducting generator 24, in accordance with one embodiment of the present disclosure. The superconducting generator 24 may be representative of one embodiment of a superconducting generator for use in the wind turbine 10 of FIG. 1. The superconducting generator 24 is housed in the nacelle 12 and coupled to the hub 20. The superconducting generator 24 includes an annular rotating armature 28 (stator), and a stationary field 30 (rotor), which is surrounded by the annular rotating armature 28. Specifically, the annular rotating armature 28 is an outer annular ring disposed co-axially around the stationary field 30. In the illustrated embodiment, the annular rotating armature 28 is rotatable and the stationary field 30 is stationary. In an alternate embodiment, the armature may be stationary and the field assembly rotatable.

A support tube 32 is coupled to the hub 20 and to the stationary field 30, wherein the stationary field 30 is coaxial with armature 28. The stationary field 30 is configured to receive a cooling agent (not shown).

Figure 3:
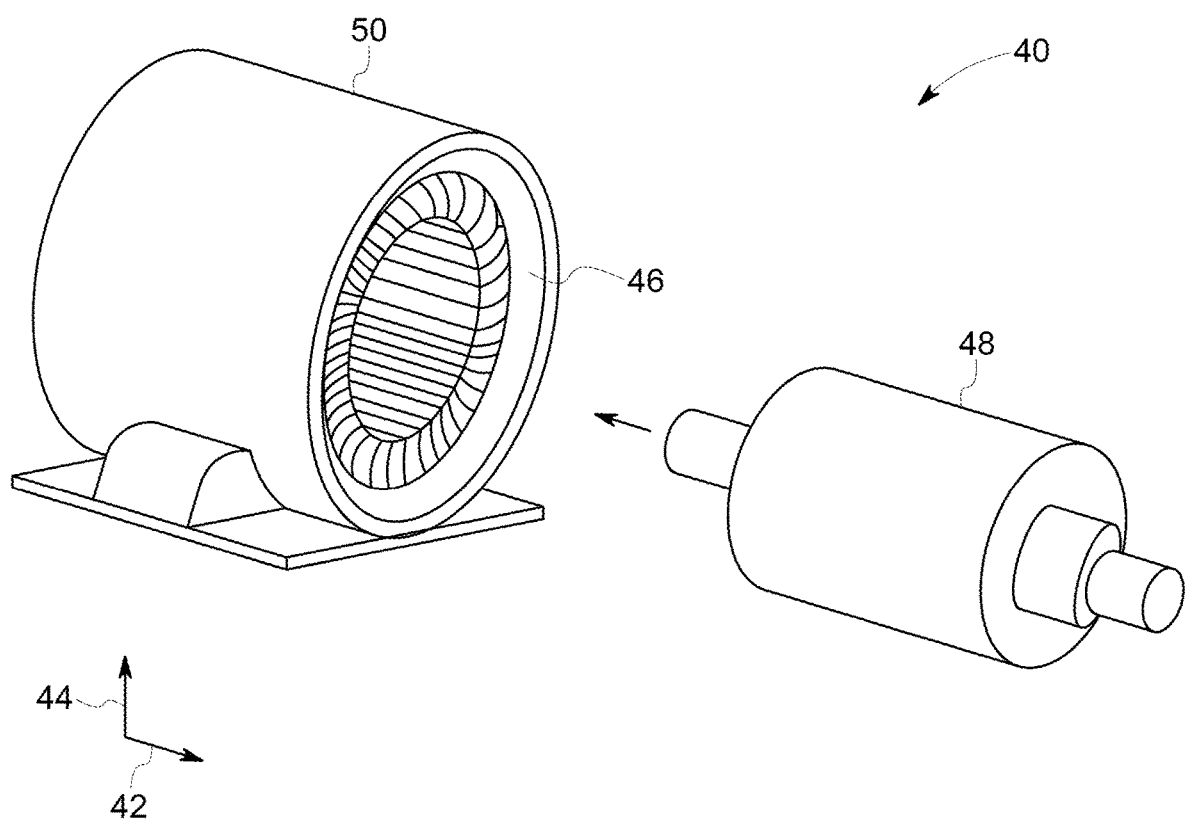
FIG. 3 is a schematic diagram of a super-conducting generator, in accordance with one or more embodiments shown or described herein.

FIG. 3 is a schematic diagram of a superconducting generator 40, in accordance with an embodiment of the present disclosure. The superconducting generator 40 may be a schematic representation of one embodiment of the superconducting generator 24 used in the wind turbine 10 of FIGS. 1 and 2. Without limiting the scope of the present application, the superconducting generator 40 may additionally be used in any application other than wind turbines. Although the superconducting generator 40 depicted in FIG. 3 is a radial field electric machine, embodiments of the present disclosure are also applicable to axial field or transverse field superconducting generators. Reference numerals 42 and 44 respectively represent an axial direction and a radial direction of the superconducting generator 40.

As depicted in FIG. 3, the superconducting generator 40 includes a stationary field 46 and the annular rotating armature 48, generally similar to the stationary field 30 and armature 28 of FIGS. 1 and 2, disposed in a cylindrical housing 50. In particular, FIG. 3 depicts an exploded view of the superconducting generator 40 to separately show the stationary field 46 and the annular rotating armature 48. The stationary field 46 includes super-conducting field winding (see FIG. 4) that is configured to generate a magnetic field oriented in the radial direction 44 of the superconducting generator 40. The annular rotating armature 48 may include a non-superconducting armature winding (see FIG. 4).

The stationary field 46 is disposed adjacent to, and concentrically outside, the annular rotating armature 48. As used herein, the term "disposed adjacent to" with respect to positioning of the stationary field 46 and the annular rotating armature 48, refers to relative positioning of the stationary field 46 and the annular rotating armature 48 such that the annular rotating armature 48 is surrounded by the stationary field 46. In another embodiment, the term "disposed adjacent to" refers to relative positioning of the stationary field 46 and the annular rotating armature 48 such that the stationary field 46 is surrounded by the annular rotating armature 48 (not shown).

By way of example, in some embodiments, when the superconducting generator 40 is deployed as the superconducting generator 24 in the wind turbine 10 of FIGS. 1 and 2, the armature 48 may be coupled to the rotor 14 of the wind turbine 10 via the shaft 26 or via both the shaft 26 and the gear box (not shown). The armature 48 may be configured to be rotated via the shaft 26. Due to the rotations of the armature 48, the superconducting generator 40 may generate electrical power by virtue of the voltage induced in armature windings as they move past the magnetic field established by a super-conducting field winding (described presently). Additional structural details of the stationary field 46 will be described in conjunction with FIG. 4.

Figure 4:
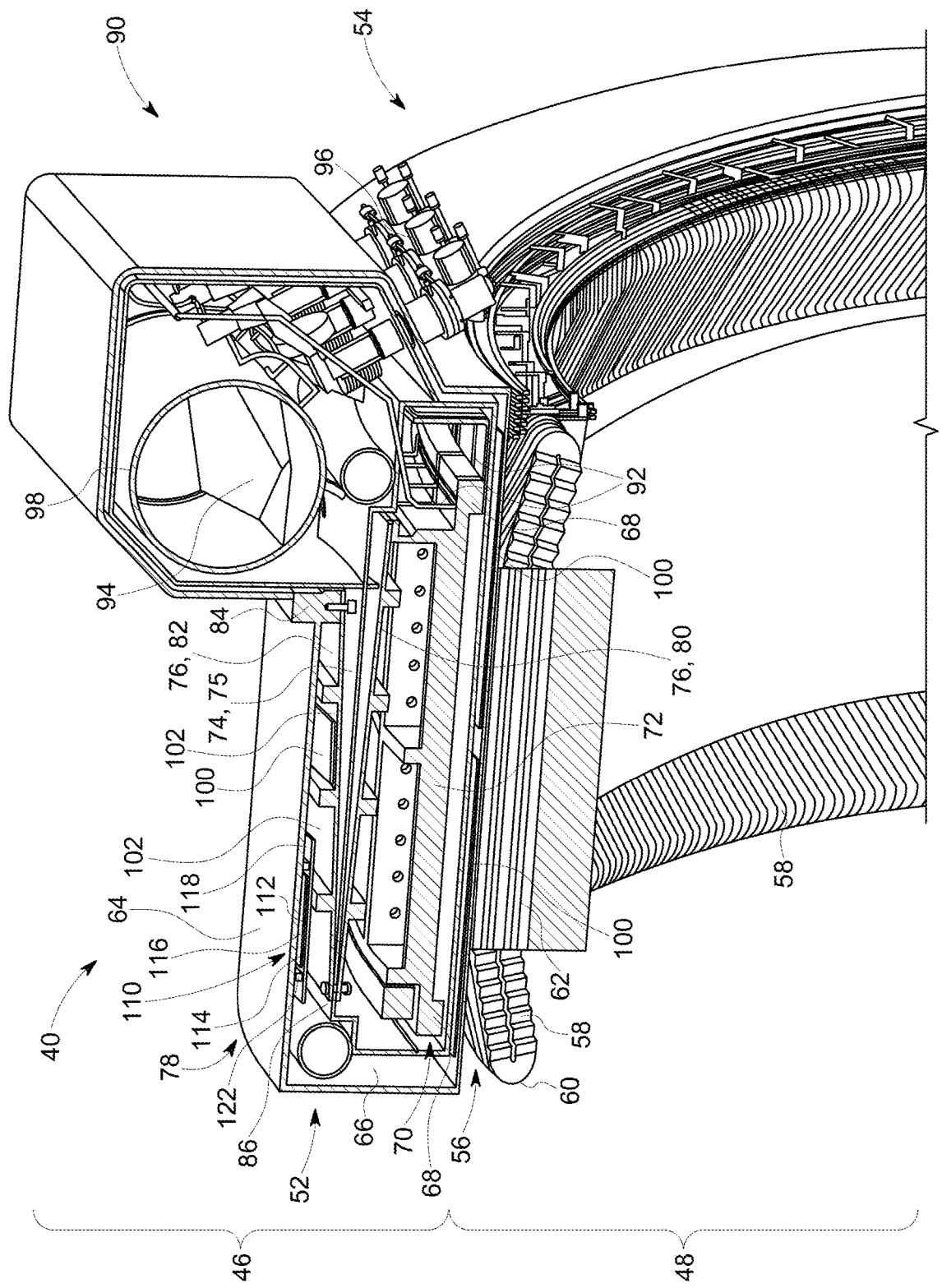
FIG. 4 is a schematic cross-sectional isometric view of the superconducting generator of FIG. 2, in accordance with one or more embodiments shown or described herein.

Turning now to FIG. 4, illustrated is a schematic isometric cross-section of the superconducting generator 40 of FIG. 3, in accordance with one embodiment of the present disclosure. As previously asserted, the superconducting generator 40 may be representative of one embodiment of the superconducting generator in the wind turbine 10 of FIG. 1. The superconducting generator 40 includes a hub end 52 coupled to hub 20 (FIG. 1) and a non-hub end 54 coupled to the tower 18 (FIG. 1). The super-conducting generator 40 includes the stationary field 46 disposed concentrically outside the armature 48. The stationary field 46 and the annular rotating armature 48 are separated by an air gap 56.

The annular rotating armature 48 includes conductive armature windings 58 (e.g., coils or bars) arranged longitudinally along the length of the annular rotating armature 48 and on an inside cylindrical surface of the annular rotating armature 48. In the exemplary embodiment, the conductive armature windings 58 are coupled at their opposite ends to one another by conductive end turns 60.

The annular rotating armature 48 further includes a cylindrical yoke 62 that supports the conductive armature windings 58. An outer surface of the cylindrical yoke 62 is fixed to a cylindrical housing. The cylindrical housing rotates along with the annular rotating armature 48.

The stationary field 46 includes an annular housing 64 (also referred to herein as a "cryostat housing 64"), defining an insulating vacuum enclosure 66, and a plurality of components disposed within the annular housing 64, The annular housing 64 and the plurality of components disposed therein form a cryostat 78.

More particularly, disposed within the annular housing 64 is a superconducting field winding 70 comprised of a plurality of race track or oval shaped coils 68 and a field coil former 72 that carries or mechanically supports the individual field coils 68. The insulating vacuum enclosure 66 is formed around a thermal shield 74 and the superconducting field winding 70. In some embodiments, the thermal shield 74 may be disposed inside the insulating vacuum enclosure 66 such that the thermal shield 74 encloses the superconducting field winding 70 and aids in maintaining the temperature of the superconducting field winding 70 to the cryogenic temperatures. The thermal shield 74 is suspended in the insulating vacuum enclosure 66 via a dual torque tube assembly 76. The torque tube assembly 76 is configured to thermally isolate the superconducting field winding 70 and to receive torque experienced by the superconducting field winding 70. More particularly, during an operation of the superconducting generator 40, a reaction torque may be generated as a result of an interaction between a magnetic field produced by the stationary field 46 and a magnetic field produced by the annular armature 48. The torque tube assembly 76 is configured to support the reaction torque caused due to the interaction between the magnetic field produced by the stationary field 46 and a magnetic field produced by the annular armature 48.

In the illustrated embodiment, the torque tube assembly 76 comprises a first torque tube 80 positioned within the thermal shield 74 and a second torque tube 82 coupled to the first torque tube 80 and positioned outside of the thermal shield 74. The torque tube assembly 76 is mounted on an annular flange 84 and coupled to the housing 64. Another flange 86 is provided at another end of the torque tube assembly 76 to facilitate elevating the thermal shield 74 from the torque tube assembly 76, and more particularly to keep the thermal shield 74 at an equal distance between the field coil former 72 and the superconducting field winding 70. One end of the torque tube assembly 76 is supported by the flange 86 against an inner wall of the thermal shield 74.

In an embodiment, the plurality of race track or oval shaped coils 68 are usually wound from superconducting wire or tape, such as (but not limited to) niobium-titanium superconducting wire. A typical range of vacuums within the insulating vacuum enclosure 66 is between generally $1 \cdot 1_{09-05}$ mbar.

The superconducting generator 40 further includes a cooling assembly 90 for cooling and maintaining the superconducting field winding 70 at cryogenic temperatures. The cooling assembly 90 may include a plurality of conduits 92 for receiving a cryogenic liquid 94, for example liquid helium and one or more cryocoolers 96, indirectly coupled to the superconducting field winding 70 and the torque tube assembly 76. A tank 98 is typically used to store the cryogenic liquid 94. Although the stationary field 46 is shown as including a single tank 98, use of two or more than two such tanks for holding the cryogenic liquid 94 is also envisioned within the scope of the present disclosure. Non-limiting examples of the cryogenic liquid 94 may include any type of gaseous or condensed cooling fluids, such as the previously mentioned liquid helium. The conduits 92 may be disposed annularly inside the insulating vacuum enclosure 66 and fluidly coupled to the tank 98. The conduits 92 are configured to facilitate flow of the cryogenic liquid 94 within the stationary field 46. The cryogenic liquid 94 is fed around the superconducting field winding 70 so as to cool the superconducting field winding 70 to achieve a superconducting condition for the superconducting field winding 70. In particular, the cryogenic liquid 94 passively circulates annularly inside the stationary field 46 through the conduits 92, driven by density gradients and phase change. While being circulated, the cryogenic liquid 94 removes any heat deposited onto or into the low-temperature structure and the super-conducting field winding 70 (such as from radiation or conduction heat transfer or from eddy current heating created by generator operation), thereby maintaining the superconducting field winding 70 at the cryogenic temperatures.

The cooling assembly 90 is further configured to retain and take up the torque, as well as bear the weight of the superconducting generator 40. In addition, the cooling assembly 90 is configured to insulate the warm end of the torque tube assembly 76 from the superconducting field winding 70 so that superconducting field winding 70 are cooled to near absolute zero (e.g., 4 K).

By way of example, in some embodiments, when the superconducting generator 40 is deployed as the superconducting generator 40 in a wind turbine, such as the wind turbine 10 of FIG. 1, the annular rotating armature 48 may be coupled to the rotor 14 (FIG. 1) of the wind turbine via the shaft 26 (FIG. 1) or via both the shaft 26 and a gear box (not shown). Consequently, the annular rotating armature 48 may be rotated due to the rotations of the rotor 14 caused due to the wind energy. Due to the rotations of the annular rotating armature 48, the superconducting generator 40 may generate electrical power by virtue of the voltage induced in the conductive armature windings 58 as they move past the magnetic field established by the stationary field 46.

During operation torque is applied by the turbine 10 to rotate the annular rotating armature 48 around the stationary field 46. Torque is applied from the annular rotating armature 48 to the stationary field 46 due to electromagnetic force coupling. The torque applied to the stationary field 46, is transmitted by the cryostat housing 64 to a mount (not shown). As previously indicated, in another embodiment the annular armature 48 is stationary and the stationary field 46 is rotatable.

The stationary field 46 further includes one or more flexible insulative blankets 100 of multi-layer thermal insulation (MLI). In an embodiment, one or more flexible insulative blankets 100 are disposed within the vacuum enclosure 66, and generally surround the thermal shield 74 about an interior of the cryostat housing 64. The one or more flexible insulative blankets 100 have an effective coefficient of thermal conductivity no higher than one micro-watt per centimeter-Kelvin at a temperature of fifty Kelvin and a pressure of one milli-torr. In an embodiment, the one or more flexible insulative blankets 100 are comprised of forty (40) layers of MLI and may be formed in any number of segmented portions.

An effective coefficient of apparent thermal conductivity for multi-layer thermal insulation in a vacuum enclosure relates to heat transfer by solid contact conduction between insulation layers, by residual gas conduction in the vacuum enclosure, and by radiation between insulation layers, as is known to the artisan. In an embodiment, additional flexible insulative blankets 100 may be disposed within one or more recesses 102 formed in an outer surface of the torque tube assembly 76, on an inner surface of the torque tube assembly 76 facing the field winding 70, on an outer surface and/or outer surface of the field coil former 72, on the torque tube assembly 76 near the first torque tube 80/second torque tube 82/thermal shield 74 assembly point. A preferred multi-layer thermal insulation for the one or more flexible insulative blankets 100 is an aluminized polyester film or plastic sheet, such as Mylar®, having an individual layer thickness of between two ten-thousandths and one thousandth of an inch. Other choices include other reflective, metalized, composite films in which each layer is either uncrinkled, or crinkled (or adjoining layers have an intervening silk or rayon net or mesh spacer layer) for layer-spacing purposes to improve insulation effectiveness, such spacing being known in the art. Each insulative layer may have two portions with overlapping, taped-together edges (not shown in the figures).

As previously stated, the thermal conduction of the torque tube assembly 76 and thermal radiation are the two primary heat loads on the superconducting generator 40. In an embodiment, the stationary field 46 has a diameter of approximately 9 m and thus has a large outer surface area that radiates onto the thermal shield 74 and onto the superconducting field winding 70. By reducing the thermal radiation heat load, the number of cryocoolers 96 required for thermal shield cooling is reduced and the levelized cost of electricity (LCOE) is reduced. In the super-conducting generator 40, forty (40) layers of MLI are optimally used in each of the plurality of flexible insulative blankets 100 for reducing the heat load to a minimum. An increase in the number of layers in the flexible insulative blankets 100 would increase the heat load, rather than decrease the heat load. To further reduce the thermal load on the superconducting generator 40, additional MLI layers need to be introduced. To provide for such, the stationary field 46 as disclosed herein further includes a partial cryogenic shielding assembly.

Referring still to FIG. 4, provided herein is the partial cryogenic shielding assembly 110 generally comprised of a thermally floating shield 112 defining a carrier body 114 that can be fitted with a further optimized layer density of MLI so as to.

As illustrated, the thermally floating shield 112 is configured as a generally annular structure disposed within the insulating vacuum enclosure 66 between the vacuum chamber wall, and more particularly the cryostat housing 64, and the thermal shield 74. The floating shield 112 extends only a partial length "L2" of an overall length "L1" (L 2<L1) of the stationary field 46 due to space constraints between the cryostat housing 64, the thermal shield 74 and the torque tube assembly 76. In an embodiment, the carrier body 114 alone reduces the heat load on the thermal shield by a factor of 2. To achieve even greater heat reduction, in an embodiment the carrier body 114 is used as a carrier for multi-layer thermal insulation.

Figure 5:
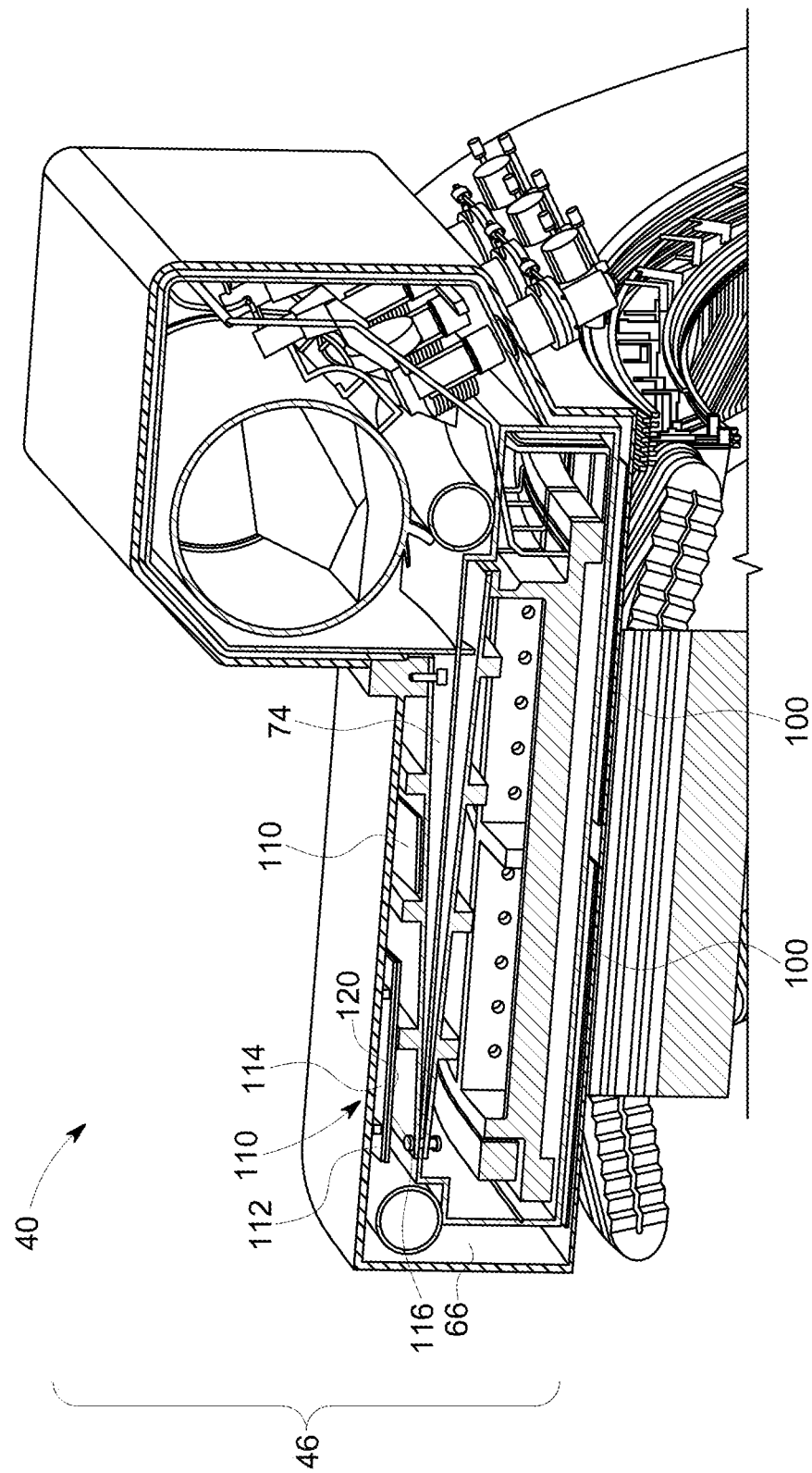
FIG. 5 is a schematic cross-sectional isometric view of another embodiment of a superconducting generator, in accordance with one or more embodiments shown or described herein.

As previously stated, in an embodiment, the floating shield 112 is comprised of the carrier body 114 having disposed thereon an insulative stack 116 comprised of multi-layer thermal insulation (MLI). As best illustrated in FIG. 4, in an embodiment the insulative stack 116 is disposed on an outer surface 118 of the carrier body 114, so as to be disposed between the carrier body 114 and the housing 64. In an alternate embodiment, as best illustrated in FIG. 5, the insulative stack 116 is disposed on an inner surface 120 of the carrier body 114, so as to be disposed between the carrier body 114 and the thermal shield 74. In yet another alternate embodiment (not shown) plurality of insulative stacks 116 are disposed on each of the outer and inner surfaces 118, 120 of the carrier body 114, and may optionally encompass the carrier body 114. One or more supporting rods 122. e.g. G10 or Vespel®, or any other low conductivity plastics material, are provided to support the carrier body 114 and the insulative stack 116.

In an embodiment the insulative stack 116 has an effective coefficient of thermal conductivity no higher than one micro-watt per centimeter-Kelvin at a temperature of fifty Kelvin and a pressure of one milli-torr. In an embodiment, the insulative stack 116 is comprised of forty (40) layers of MLI. In another embodiment, the insulative stack 116 is optimized and comprised of any number of layers of MLI. A preferred multi-layer thermal insulation for the insulative stack 116 is comprised of aluminized polyester film or plastic sheets, such as Mylar®, having an individual layer thickness of between two ten-thousandths and one thousandth of an inch. Other choices include other reflective, metalized, composite films where each layer is uncrinkled or crinkled (or adjoining layers have an intervening silk or rayon net or mesh spacer layer) for layer-spacing purposes to improve insulation effectiveness, such spacing being known in the art. In an embodiment, the insulative stack 116 and the carrier body 114 that comprise the floating shield 112 have an overall radial thickness dimension of approximately 14 mm.

Figure 6:
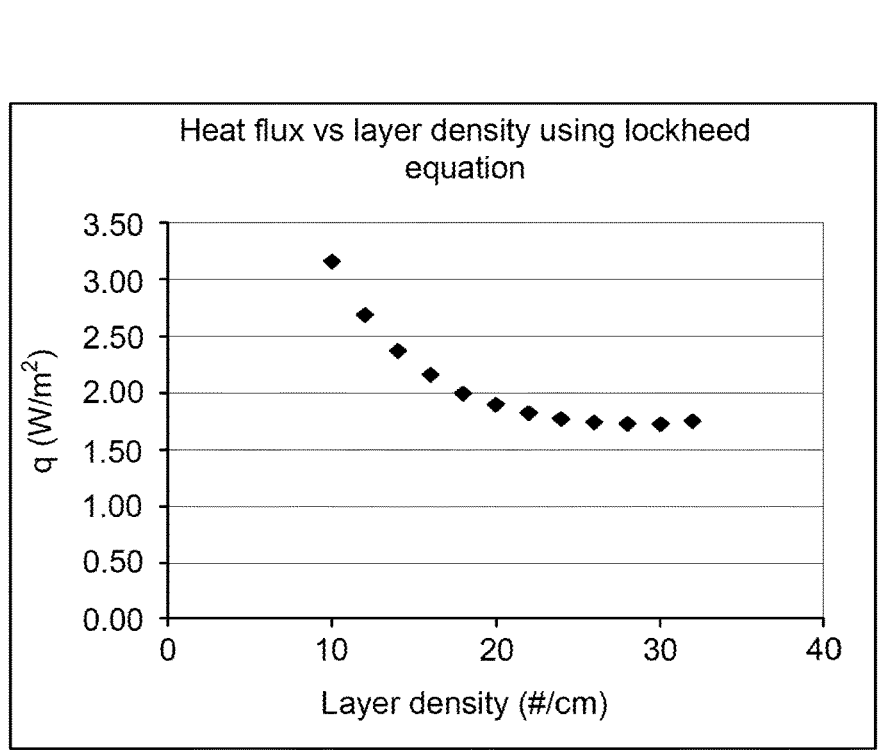
FIG. 6 is a graphical representation of the heat flux density of a superconducting generator with partial cryogenic shielding.
Figure 7:
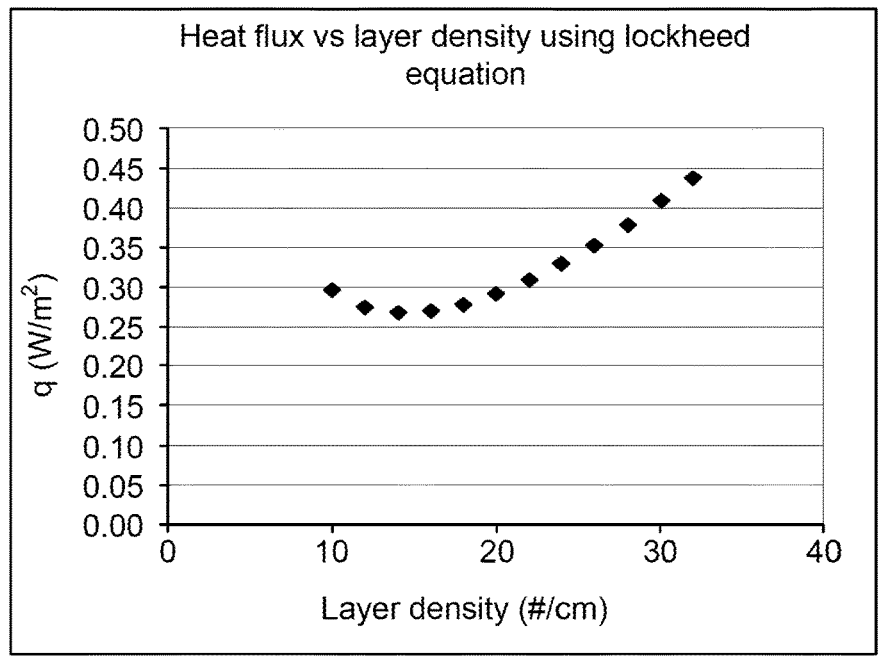
FIG. 7 is a graphical representation of the resulting heat flux density to the thermal shield in a superconducting generator with partial cryogenic shielding, in accordance with one or more embodiments shown or described herein.

Referring now to FIGS. 6 and 7, respectively, illustrated graphically are heat flux calculations in an embodiment with the inclusion of a partial cryogenic shielding assembly, referenced 150, and the resulting heat flux to the main thermal shield 74, referenced 160.

When utilizing multilayer insulations in cryogenics, the Lockheed equation is generally used for practical heat flux calculations. With reference back to FIG. 4, the main purpose of adding the insulative stack 116 onto the carrier body 114 that comprises the floating shield 112 is to substantially reduce the surface temperature of the floating shield 112. By reducing the temperature that surrounds the main thermal shield 74, a heat flux density onto the main thermal shield 74 is further reduced.

The heat load reduction of a heated vacuum vessel to a thermal shield. e.g. for a superconducting generator, is typically given in terms of heat flux density through a stack of insulation blankets. If, for example, the vacuum vessel outer surface, such as the outer surface of the annular housing 64 that defines the insulating vacuum enclosure 66, is maintained at 350 K and the floating shield 112 temperature is maintained at 200 K, a resulting thermal heat flux density of 1.75 W/m² through the insulative stack 116 can be anticipated, as shown in FIG. 6. Since the 200 K boundary temperature of the floating shield 112 is maintained, this reduced surface temperature radiates through the insulative stack 116 to a surface 75 of the main thermal shield 74 that is maintained at 50 K by using cryocoolers, and results in a heat flux density.

In an embodiment, the floating shield 112 would optimally require 30 layers/cm to arrive at 1.75 W/m² for the temperature region of 350 to 200 K, whereas only 20 layers are needed with 0.25 W/m² between 200 and 50 K, as best illustrated at in FIG. 7.

Assuming a typical area of the floating shield 112 is 50 m², calculations provide that the floating shield 112 receives thermal radiation of 87.5 W, whereas the 50 K main thermal shield 74 receives thermal radiation of 12.5 W.

In an embodiment, without the incorporation of the floating shield 112, as described herein, an average value of 1.5 W/m² can be used based on assembly experience (from 350 to 50 K). In this case, 75 W would radiate directly onto the main thermal shield 74 which results in increased external cooling power requirements and higher LCOE. By introducing the floating shield 112 where needed, cooling power required from the cryocooler 96 is reduced by a factor of approximately 6. An additional benefit of the floating shield 112 is the reduction of circumferential temperature gradients in the main thermal shield 74, from point of contact with the cryocooler 96 at 0 degree at an upper portion, to the lower portion of the main thermal shield 74 at 180 degrees.

In accordance with the embodiments described herein, an improved wind turbine such as the wind turbine 10 and an improved superconducting generator such as the superconducting generator 40 are provided. The improvements in the wind turbine 10 and the superconducting generator 40 may be achieved, at least partially, due to the addition of a partial cryogenic shielding assembly 110 to the stationary field 46, in accordance with embodiments of the present disclosure. As previously stated, the torque tube assembly 76 and thermal radiation are the two primary heat loads on the superconducting generator 46. The present disclosure provides a superconducting generator 40, and more particularly a stationary field 46 having a low-cost partial cryogenic shielding assembly 110 that is easily installed and provides additional reduction of the thermal radiation heat load on the stationary field 46. The partial cryogenic shielding assembly 110 provides improved thermal shielding thus a reduction in the levelized cost of electricity (LCOE), the requirement for less cryocoolers 96, more reliability, longer ridethrough, and a smaller total heat load on superconducting field winding 70.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A stationary field comprising:
   a housing extending a first length and defining an insulating vacuum enclosure therein;
   at least one superconducting field winding disposed within the vacuum enclosure and spaced apart from the housing;
   a thermal shield disposed within the vacuum enclosure and surrounding and spaced apart from the at least one superconducting field winding;
   a torque tube assembly disposed within the housing and coupling the thermal shield to the housing;
   at least one flexible blanket of multi-layer thermal insulation disposed within the vacuum enclosure, generally surrounding the thermal shield, extending generally to the housing and generally to the thermal shield; and
   a partial cryogenic shielding assembly disposed within the vacuum enclosure, the partial cryogenic shielding assembly extending a second length, wherein the second length is less than the first length, the partial cryogenic shielding assembly coupled to the housing and partially surrounding and generally spaced apart from the thermal shield.

2. The stationary field of claim 1, wherein the partial cryogenic shielding assembly comprises a floating shield disposed between the housing and the thermal shield, the floating shield defined by a carrier body.

3. The stationary field of claim 2, wherein the partial cryogenic shielding assembly further comprises an insulative stack of multi-layer thermal insulation.

4. The stationary field of claim 3, wherein the insulative stack of multi-layer thermal insulation is comprised of a plurality of layers of a reflective, metalized, composite film.

5. The stationary field of claim 4, wherein the plurality of layers of reflective, metalized, composite film comprise a plurality of layers of at least one of an aluminized polyester film or plastic sheet.

6. The stationary field of claim 4, wherein each layer of the plurality of layers of reflective, metalized, composite film has a layer thickness of between two ten-thousandths and one thousandth of an inch.

7. The stationary field of claim 1, wherein the partial cryogenic shielding assembly is coupled to the housing.

8. The stationary field of claim 1, wherein the torque tube assembly comprises:
   a first torque tube positioned within the thermal shield; and
   a second torque tube coupled to the first torque tube and positioned outside of the thermal shield,
   wherein the first and second torque tubes are configured to thermally isolate the at least one superconducting field winding and to receive torque experienced by the at least one superconducting field winding.

9. A superconducting generator comprising:
   an annular armature comprising a conductive armature winding; and an annular field including a plurality of superconducting magnets disposed concentrically, outside the annular armature and separated by an air gap, the annular field further comprising:

a housing extending a first length and defining an insulating vacuum enclosure therein;

at least one superconducting field winding disposed within the insulating vacuum enclosure and generally spaced apart from the housing;

a thermal shield disposed within the insulating vacuum enclosure and generally, surrounding and generally spaced apart from the at least one superconducting field winding; and a partial cryogenic shielding assembly disposed within the vacuum enclosure, the partial cryogenic shielding assembly extending a second length, wherein the second length is less than the first length, the partial cryogenic shielding assembly partially surrounding and generally spaced apart from the thermal shield, wherein one of the annular armature and the annular field is rotatable and the other of the annular armature and the annular field is stationary.

10. The superconducting generator of claim 9, the annular field further comprising:

a torque tube assembly disposed within the housing, the torque tube assembly comprising:

a first torque tube positioned within the thermal shield; and a second torque tube coupled to the first torque tube and positioned outside of the thermal shield; and a flexible blanket of multi-layer thermal insulation disposed within the vacuum enclosure, surrounding the thermal shield and extending to the housing and to the thermal shield.

11. The superconducting generator of claim 9, wherein the annular armature is rotatable and the annular field is stationary.

12. The superconducting generator of claim 9, wherein the partial cryogenic shielding assembly comprises a floating shield disposed between the housing and the thermal shield, the floating shield defined by a carrier body.

13. The superconducting generator of claim 9, wherein the partial cryogenic shielding assembly is coupled to the housing.

14. The superconducting generator of claim 9, wherein the partial cryogenic shielding assembly further comprises an insulative stack of multi-layer thermal insulation.

15. The superconducting generator of claim 14, wherein the insulative stack of multi-layer thermal insulation is comprised of a plurality of layers of a reflective, metalized, composite film and wherein each layer of the plurality of layers of reflective, metalized, composite film has a layer thickness of between two ten-thousandths and one thousandth of an inch.

16. The superconducting generator of claim 9, wherein the annular field further comprises a cooling assembly configured to maintain the at least one super-conducting field winding at a temperature that is below a threshold temperature.

17. A wind turbine, comprising:

a rotor comprising a plurality of blades; a shaft coupled to the rotor; and a super-conducting generator coupled to the rotor via the shaft and configured to be operated via the rotor, wherein the superconducting generator comprises:

an annular rotating armature; and an annular stationary field disposed concentric to the annular rotating armature, wherein the annular stationary field comprises:

a housing extending a first length and defining a vacuum enclosure therein;

a superconducting field winding disposed within the vacuum enclosure and generally spaced apart from the housing;

a thermal shield disposed within the vacuum enclosure and generally surrounding and generally spaced apart from the superconducting field winding;

a torque tube assembly disposed within the housing and coupling the thermal shield to the housing;

a flexible blanket of multi-layer thermal insulation disposed within the vacuum enclosure, generally surrounding the thermal shield, extending generally to the housing and generally to the thermal shield; and a partial cryogenic shielding assembly disposed within the vacuum enclosure, the partial cryogenic shielding assembly extending a second length, wherein the second length is less than the first length, the partial cryogenic shielding assembly coupled to the housing and partially surrounding and generally spaced apart from the thermal shield.

18. The wind turbine of claim 17, wherein the partial cryogenic shielding assembly comprises a floating shield disposed between the housing and the thermal shield, the floating shield defined by a carrier body.

19. The wind turbine of claim 17, wherein the partial cryogenic shielding assembly is coupled to the housing.

20. The wind turbine of claim 17, wherein the partial cryogenic shielding assembly further comprises an insulative stack of multi-layer thermal insulation.

\* \* \* \* \*